United States Patent
Li et al.

(10) Patent No.: US 11,489,490 B2
(45) Date of Patent: Nov. 1, 2022

(54) ARC FAULT DETECTION METHOD FOR PHOTOVOLTAIC SYSTEM BASED ON ADAPTIVE KERNEL FUNCTION AND INSTANTANEOUS FREQUENCY ESTIMATION

(71) Applicant: XI'AN JIAOTONG UNIVERSITY, Shaanxi (CN)

(72) Inventors: Xingwen Li, Shaanxi (CN); Silei Chen, Shaanxi (CN); Yu Meng, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 412 days.

(21) Appl. No.: 16/629,033

(22) PCT Filed: Dec. 29, 2018

(86) PCT No.: PCT/CN2018/125440
§ 371 (c)(1),
(2) Date: Jan. 6, 2020

(87) PCT Pub. No.: WO2020/087752
PCT Pub. Date: May 7, 2020

(65) Prior Publication Data
US 2021/0036656 A1 Feb. 4, 2021

(30) Foreign Application Priority Data

Oct. 29, 2018 (CN) .......................... 201811269779.1

(51) Int. Cl.
*H02S 50/00* (2014.01)
*G05B 23/02* (2006.01)
*G06N 20/00* (2019.01)

(52) U.S. Cl.
CPC .......... *H02S 50/00* (2013.01); *G05B 23/0259* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 2013/0226479 A1* | 8/2013 | Grosjean | ................ | G01R 31/52 702/58 |
| 2014/0168843 A1* | 6/2014 | Privitera | ................ | G01R 31/50 702/58 |
| 2018/0238951 A1* | 8/2018 | Tao | ....................... | G06K 9/6269 |

OTHER PUBLICATIONS

Espacenet machine translation, Gao Yunhui et al., "Photovoltaic system direct-current arc fault feature extraction and recognition method and device," CN108037422A, May 15, 2018 (Year: 2018).*

(Continued)

*Primary Examiner* — Kyle R Quigley
*Assistant Examiner* — Denise R Karavias

(57) ABSTRACT

An arc fault detection method for a photovoltaic system based on an adaptive kernel function and instantaneous frequency estimation includes steps of: sampling signal $x_t$ in a time window length of $T_{NCT}$ and obtaining an iterative time-frequency diagram of $x_t$ by nonlinear chirplet transform; extracting detection variables based on frequency component in the selected iterative time-frequency diagram to determine a moment when spectrum energy increases; when the moment is found, obtaining a matrix distribution form of the $x_t$ in time-frequency domain obtained by the adaptive optimum kernel time-frequency representation, and processing the matrix with sum of squares in a time dimension to obtain a column vector; processing each selected frequency bands with integration operation in a frequency dimension to obtain multiple detection variable values as inputs of a well-trained Naive Bayes model.

9 Claims, 14 Drawing Sheets

(56) References Cited

OTHER PUBLICATIONS

Espacenet machine translation, Chen Silei et al., "Method utilizing independent component analysis and S transformation to detect photovoltaic system fault arcs under system process coupling conditions," CN107154783A, Sep. 12, 2017 (Year: 2017).*

Espacenet machine translation, Chen Zhicong et al., Photovoltaic string fault diagnosis method based on kernel function limit learning machine, CN106021806A, Oct. 12, 2016 (Year: 2016).*

* cited by examiner

ARC FAULT DETECTION METHOD FOR PHOTOVOLTAIC SYSTEM BASED ON ADAPTIVE KERNEL FUNCTION AND INSTANTANEOUS FREQUENCY ESTIMATION

CROSS REFERENCE OF RELATED APPLICATION

This is a U.S. National Stage under 35 U.S.C 371 of the International Application PCT/CN2018/125440, filed Dec. 29, 2018, which claims priority under 35 U.S.C. 119(a-d) to CN 201811269779.1, filed Oct. 29, 2018.

BACKGROUND OF THE PRESENT INVENTION

Field of Invention

The present invention relates to a field of electrical system fault detection of photovoltaic systems, and more particularly to a method of determining operating states of photovoltaic systems by finding the moment when the spectrum energy increases based on nonlinear chirplet transform, and inputting multiple time-frequency characteristics based on adaptive optimum kernel time-frequency representation into a Naive Bayes model, thereby ensuring that arc faults can be accurately judged even under the interference of various types of arc conditions, so that the corresponding arc faults can be extinguished and the safe operation of photovoltaic systems can be guaranteed.

Description of Related Arts

Conventional development of power electronics semiconductor technology allows DC voltage transformation to be achieved by DC converters, and a broader generalized DC load, which is becoming increasingly common, can be connected to non-aqueous renewable power generation systems through DC converters. This kind of DC micro-grid architecture can reduce the operation cost of the power supply system and improve the power supply efficiency of the system by reducing the conversion link. For a solar photovoltaic power generation system, which is one of the typical non-aqueous renewable power generation systems, once the line insulation aging, line breakage or loose connection occurs in the system, the arc fault caused will lead to fire accidents, threatening the power supply and personal safety.

Conventionally, the characteristic capture of photovoltaic system arc fault often uses its electrical characteristics. However, the photovoltaic system will inevitably experience the startup process at sunrise and the normal switching process of the DC load during operation. These normal system transient transition processes will also affect the collected system power signals, forming the same time-domain shape as the arc fault has. These conditions are collectively called fault-like. Fault-like conditions will form some characteristics similar to those of the arc fault, which will interfere with the correct judgment of the arc fault, resulting in the malfunction of the arc fault detection device and frequent unnecessary shutdown states of the photovoltaic system. Such conditions seriously affect the system power supply stability and greatly reduce the operating efficiency of photovoltaic systems.

At the conventional stage, the arc fault protection products for the photovoltaic systems are not yet advanced, and the research on the arc fault characteristics is still in its infancy. It is of great value to study how to effectively distinguish arc faults and fault-like ones for theoretical research on arc fault characteristics. Therefore, the unique arc fault characteristics in the photovoltaic systems should be studied to build a complete arc fault detection algorithm based on these unique arc fault characteristics, so that arc faults can be accurately, reliably and quickly identified under fault-like disturbances, which is of great significance for the reliable power supply of the photovoltaic system and the maintenance of power safety.

SUMMARY OF THE PRESENT INVENTION

An object of the present invention is to provide an arc fault detection method for a photovoltaic system based on an adaptive kernel function and instantaneous frequency estimation, so as to accurately, reliably and quickly identify arc faults under fault-like disturbances of the photovoltaic system.

Accordingly, in order to accomplish the above object, the present invention provides steps of:

1) sampling current signals in the photovoltaic system point by point with $T_{NcT}$ as a time window length to obtain a detection signal $x_t$, and executing a step 2);

2) processing the detection signal $x_t$ with nonlinear chirplet transform to obtain complex time-frequency matrices of the detection signal $x_t$ after multiple iterations; selecting u iterated complex time-frequency matrices, and processing modules of elements at specified frequency components of the selected u iterated complex time-frequency matrices with sum of squares in a frequency dimension (frequency axis direction); extracting n detection variables $NC_i(t)$, i=1, 2, 3 . . . , n (n is a total number of extracted detection variables), and forming a two-dimensional matrix M of n×$T_{NCT}$; calculating a detection variable change from a latter moment (latter column) to a former moment (former column) of M along a time dimension (time axis direction), and comparing with corresponding elements of a threshold column vector Y; wherein if more than m values of the detection variable change corresponding to a sampling moment (the first moment in the time window doesn't count) in a time window are higher than a corresponding threshold, then a current signal of the time window is judged to have spectrum energy increase, and the detection signal $x_t$ is divided into y periods before executing a step 3); otherwise, the photovoltaic system is judged to be in normal states at the sampling moment, and a detection variable change corresponding to a next sampling time is compared until all detection signals of the time window is judged to be in a normal state of the photovoltaic system; then the step 1) is executed again to sample detection signals of a next time window;

3) performing adaptive optimum kernel time-frequency representation from a next period of the spectrum energy increase to obtain a complex time-frequency matrix corresponding to a time-frequency domain; selecting r frequency bands in the frequency dimension, and processing real parts of corresponding elements with sum of squares in the time dimension to obtain a corresponding column vector; then processing each selected frequency band with integration operation in the frequency dimension to extract r detection variables as input vectors, and executing a step 4);

4) using well-trained Naive Bayes model and values of the corresponding r detection variables to conduct state classification of the input vectors; wherein if an output value is 0, the period is judge to be in an arc fault state, and a step 5) is executed; if the output value is 1, the period is judge to be in a fault-like state, and a count variable is cleared before returning to the step 1) to sample and judge the detection signals of the next time window; and 5) counting the period having the output value of 0 classified by the naive Bayesian model with the count variable, wherein if there are p periods having the output value of 0, the photovoltaic system is judged to have arc fault, and a control signal for circuit breaking is sent out to extinguish the arc fault; otherwise, a detection signal of the next period is analyzed according to the step 3).

Preferably, the current signals are signals sampled by a Hall sensor and filtered by a high-pass filter, or signals directly sampled by a current transformer.

Preferably, a selection principle of the time window length $T_{NCT}$ is that the detection signal within the time window having determined length can reflect effective time-frequency characteristics of the arc fault; $T_{NCT}$ is ranged from 4 ms to 40 ms; periods y is ranged from 2 to 10.

Preferably, in the step 2) and the step 3), parameters of the multiple time-frequency transform are determined based on significant time-frequency characteristics that separate the arc fault from the fault-like working conditions to a greatest extent; wherein polynomial order selected by the nonlinear chirplet transform is ranged from 10 to 30; an iteration termination condition is reaching a predetermined number of iterations; and the number of the iterations is ranged from 3 to 8; an output frequency division scale of the adaptive optimum kernel time-frequency representation is ranged from 256 to 8192.

Preferably, an effective number of iterations (namely u) of the nonlinear chirplet transform and selection principles of the frequency components are to accurately indicate the time window where the arc fault occurs in a pulse form, and display a larger amplitude difference between the arc fault state and the fault-like state with consistency; u is ranged from 2 to 5; the frequency component is specified according to arc fault characteristic frequency bands; the number of arc fault characteristic frequency bands selected at different iterations is same or different; the arc fault characteristic frequency bands are all within 5-50 kHz, and the selected arc fault characteristic frequency bands partially overlap or are continuously divided or have intervals; n according to the effective number of iterations and frequency band components is ranged from 5 to 10.

Preferably, a threshold judgment processing method is adopted for n detection variables $NC_i(t)$ extracted based on the non-linear frequency modulation wavelet transform; a threshold setting principle in the threshold column vector Y is to obtain amplitude change mode of the detection signal $x_t$ at each detection variable level, and the threshold corresponding to the different detection variables $NC_i(t)$ is same or different; m for determining whether the spectrum energy increases at the current sampling time is ranged from (n−2) to n.

Preferably, after the adaptive optimum kernel time-frequency representation is completed, selection principle of the r frequency bands effective in the frequency dimension is to accurately indicate the time window where the arc fault occurs in the pulse form, and display the larger amplitude difference between the arc fault state and the fault-like state with consistency; the r frequency bands are selected according to arc fault characteristic frequency bands which are ranged from 0 to 50 kHz; the selected arc fault characteristic frequency bands partially overlap or are continuously divided or have intervals; r of the extracted detection variables is ranged from 3 to 7.

Preferably, an output state of the Naive Bayes model during learning and training is marked as follows: marking as 1 if an arc voltage in a corresponding period is zero, and marking as 0 if the arc voltage in the corresponding period is non-zero; training sample size is ranged from 1500 to 3000.

Preferably, p is a trigger threshold value of the arc fault, and selection principle is based on rapid arc removal of the arc fault and fault-like working condition judgment without malfunction; p is ranged from 18 to 120.

The present invention has beneficial technical effects as follows.

1) The nonlinear chirplet transform in the present invention makes the calculation result more accurate, can more accurately describe the change law of complex frequencies in the detection signal $x_t$, and has a good concentration of time-frequency energy for arc faults, which can obtain better arc fault time-frequency characteristics aggregation than linear time-frequency transform, and improve the anti-noise ability of the arc fault characteristics.

2) The adaptive time-frequency analysis in the present invention intercepts the signal autocorrelation function, and meticulously describes the details of the detection signal $x_t$, so that there is no mutual constraint relationship between the time-frequency resolution of the detection signal $x_t$, and better time-frequency localization is obtained. As a result, the time-frequency distribution accuracy requirements for algorithm analysis are met, which is beneficial to discovering the unique characteristics of arc faults that are different from fault-like ones. This analysis method compromises the suppression of cross-terms and attenuation of self-terms, thereby solving cross-term interference problem caused by time-frequency resolution increase.

3) The present invention extracts multiple detection variables from the detection signal. The detection variable group of the nonlinear chirplet transform is used to filter out the normal state and most fault-like states. Only the arc fault state and a few fault-like states need to be processed by adaptive time-frequency analysis and Naive Bayes model calculation. The nonlinear frequency-modulated wavelet transform and adaptive time-frequency analysis need to store very few intermediate matrices, and the corresponding detection variables can use real-time calculation replacement mode, which greatly reduces memory consumption of the detection algorithm, and reduces the hardware dependence of arc fault detection.

4) In the nonlinear chirplet transform and the calculation of its detection variables, the present invention uses a wide time window to calculate the normal state current signal for each time. The precise time scale of the transform itself is helpful for locating the moment when the arc fault occurs. After the moment when the suspected arc fault occurs, a narrower analysis period is used to calculate the current signal. The interlaced calculation timing of the nonlinear chirplet transform and adaptive time-frequency analysis effectively improves the calculation speed of the detection algorithm and satisfies rapid test requirements of the arc fault.

5) The present invention proposes a detection variable group composed of multiple detection variables at each level of the nonlinear chirplet transform and adaptive time-frequency analysis. If one detection variable fails, other detection variables can still ensure the effective judgment of the system states. The cooperation between two levels can greatly improve the accuracy of arc fault or fault-like working condition classification, and meet the reliability requirements of arc fault detection.

Furthermore, the present invention takes full advantages of the nonlinear chirplet transform and adaptive time-frequency analysis to extract the respective optimal time-frequency characteristics. The extracted detection algorithm can reliably, accurately and quickly extinguish the arc fault under the circumstance of preventing system fault-like interference, ensuring that the arc fault is accurately distinguished from the fault-like working conditions caused by factors such as load change, system startup, etc. On the promise of safety of electricity consumption, the power supply stability of the photovoltaic system is fully guaranteed.

DETAILED DESCRIPTION OF THE PREFERRED EMBODIMENT

Figure 1:
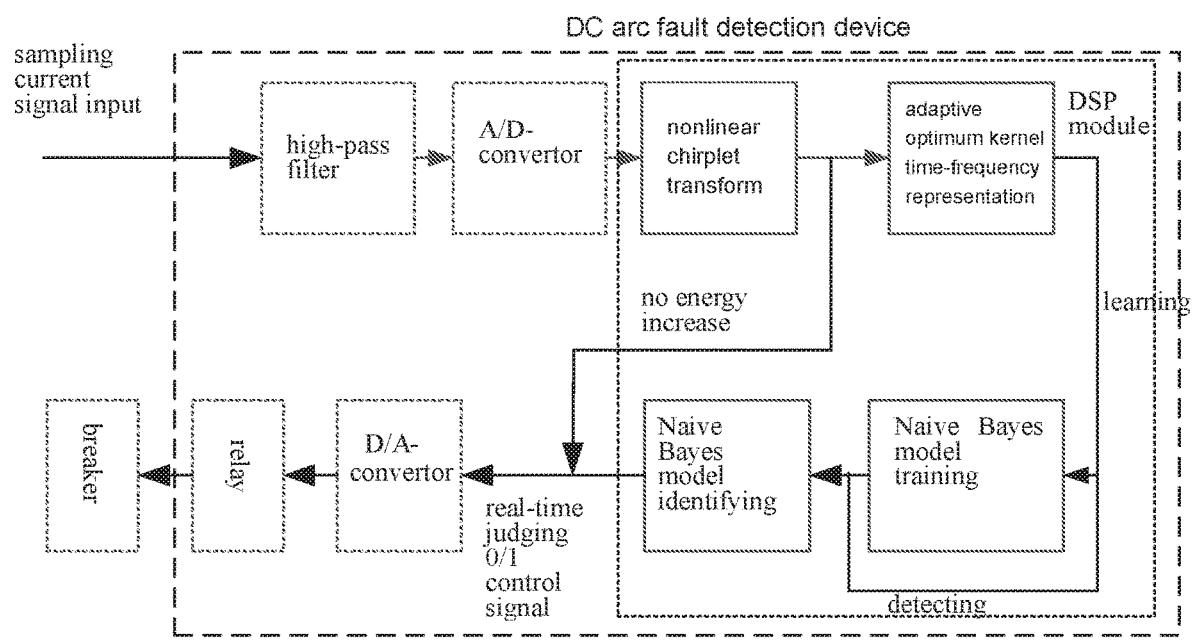
FIG. 1 is a hardware principle framework diagram of arc fault detection algorithm for a photovoltaic system according to an embodiment of the present invention.

Referring to the drawings and embodiments, the present invention will be further illustrated.

(I) Hardware Implementation of an Arc Fault Detection Algorithm for a Photovoltaic System Proposed by the Present Invention First, current signals of the photovoltaic system under different fault-like conditions and arc fault conditions are sampled according to time windows. If the current signals are acquired by Hall sensors, they are processed by high-pass filtering (to remove DC component). If the current signals are acquired by a current transformer, subsequent feature layer process is directly performed. The Hall sensor or the current transformer is installed in a photovoltaic string to be monitored or a photovoltaic array DC bus, or shares a system current sampling device of an inverter. As shown in FIG. 1, the sampled current signal is input to the DC arc fault detection device, and is then input to a DSP processing module after high-pass filtering and A/D conversion modules. During DSP module processing, the current signal undergoes multi-feature processing of nonlinear chirplet transform to obtain a corresponding two-dimensional matrix M, which is used to determine the moment when the spectrum energy increases. After finding out the moment, the current signal under the current time window length is divided into finer scales to form multiple periods, so as to perform adaptive optimum kernel time-frequency representation from a next period of the spectrum energy increase and obtain corresponding multiple detection variable values as an input vector of a Naive Bayes model.

Based on a prior knowledge of arc voltage signal corresponding to the current signal, a class label is added to a last line of the input vector to generate training and learning samples for the Naive Bayes model. After the Naive Bayes model learns the samples and state classification accuracy rate of the well-trained model is tested, multiple time-frequency characteristics based on the adaptive optimum kernel time-frequency representation can be extracted from a current sampling signal in the input time window, which is then input to the well-trained. Naive Bayes model for state judgment. The Naive Bayes model can output 0/1 judgment results of the arc fault in the photovoltaic system in real time, which outputs 0 when the arc fault occurs and outputs 1 when the system is normal. Only when the Naive Bayes model continuously outputs a predetermined number of 0 can the arc fault removal signal be triggered. That is to say, the control signal output by the DSP processing module drives a relay through the D/A conversion module, so as to control circuit breakers at corresponding branches of the photovoltaic system to cut off. Before the Naive Bayes model reaches the predetermined number of 0, any output of 1 will render the result to be a fault-like interference rather than a real arc fault working condition.

(II) Steps of the Arc Fault Detection Algorithm for the Photovoltaic System According to the Present Invention Sampling signal $x_t$ in a time window with the length of $T_{NCT}$ and obtaining an iterative time-frequency diagram of $x_t$ by nonlinear chirplet transform; extracting detection variables based on frequency component in the iterative time-frequency diagram to determine a moment when spectrum energy increases; when the moment (of spectrum energy increase) is found, obtaining a matrix distribution form of the $x_t$ obtained by the adaptive optimum kernel time-frequency representation in a time-frequency domain, and processing the matrix with sum of squares by lines (in a time dimension) to obtain a column vector; selecting and processing multiple frequency bands with integration operation in a frequency dimension to obtain multiple detection variable values as inputs of a well-trained Naive Bayes model; and determining photovoltaic system states in a current period. The present invention can accurately identify the arc fault in the photovoltaic system through a plurality of effective time-frequency characteristics, and at the same time can ensure that there is no malfunction under various fault-like working conditions, so that the photovoltaic system runs safely and stably.

Figure 2:
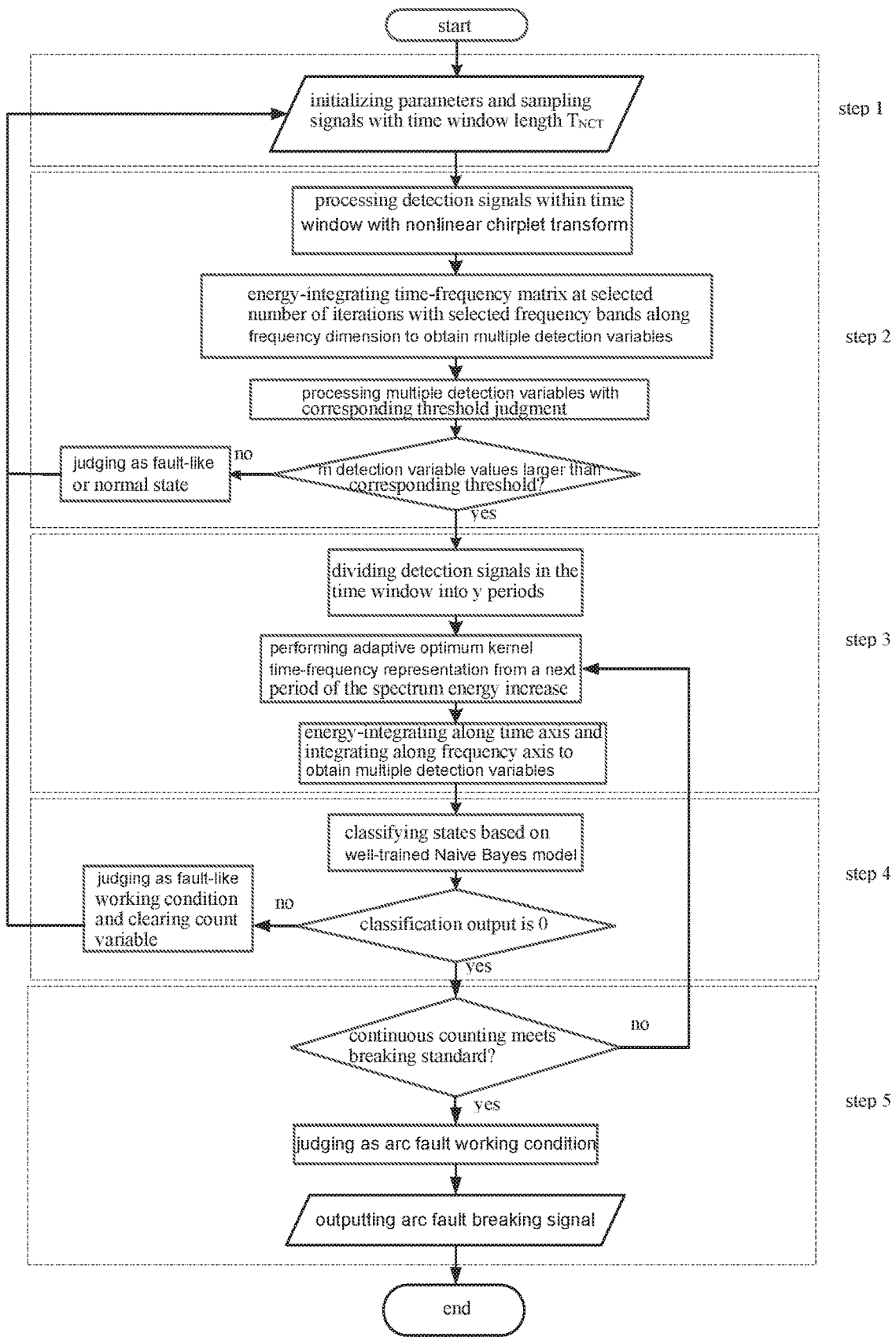
FIG. 2 is a flowchart of the arc fault detection algorithm for the photovoltaic system according to the embodiment of the present invention.

A core of the arc fault detection algorithm for the photovoltaic system is an arc fault detection method for the photovoltaic system based on an adaptive kernel function and instantaneous frequency estimation; comprising specific steps as follows (as shown in FIG. 2).

Step 1: The parameter initialization process involves time window length $T_{NCT}$, threshold column vectors Y, m (trigger threshold of spectrum energy increase), arc fault trigger threshold p, and various parameters in nonlinear frequency-modulated wavelet transform and adaptive optimum kernel time-frequency representation (polynomial order selected for the nonlinear chirplet transform, number of iterations, output frequency division scale of the adaptive optimum kernel time-frequency representation, etc.).

In the photovoltaic system, the current signals are sampled with $T_{NCT}$ as a time window length. The current signals are signals sampled by a Hall sensor and filtered by a high-pass filter, or signals directly sampled by a current transformer without DC component. Considering a mutual constraint relationship between time and frequency resolution obtained by the nonlinear chirplet transform, if the time window is too short, frequency division accuracy of two-dimensional complex time-frequency matrix obtained by the nonlinear chirplet transform will be insufficient and cannot reflect basic characteristic difference between the arc fault and the fault-like interference; if the time window is too long, the algorithm will put heavy load on detection device hardware such as memory and main frequency. Therefore, $T_{NCT}$ is ranged from 4 ms to 40 ms.

Step 2: The nonlinear chirplet transform method is used to analyze the current detection signal $x_t$ collected under the t-th time window to obtain a complex matrix time-frequency distribution form of the output current signal of the photovoltaic system under the time window. And u iterative complex time-frequency matrices is selected to process modules of elements at specified frequency components with sum of squares in a frequency dimension (which means the time-frequency matrix at the selected number of iterations is energy-integrated along the frequency dimension according to the selected arc fault characteristic frequency band), thereby extracting n detection variables. By comparing amplitude difference between normal, fault-like and arc fault states, and considering reducing the iteration and frequency component calculations as much as possible on the premise of ensuring reliability of the arc fault detection, the effective number of iterations u (the number of effective iterations equal to the selected number of iterative complex time-frequency matrices, which is less than or equal to the number of iterations at the end of the iteration) is ranged from 2 to 5. The number of specified frequency components selected in the selected effective number of iterations can be different, but they are all selected within arc fault characteristic frequency bands of 5-50 kHz, a total number n of the detection variables extracted by the frequency band components under each effective iteration number (u) is ranged from 5 to 10.

The n detection variables forms a two-dimensional matrix M in the time window, and M is compared with corresponding elements of a threshold column vector Y in the time dimension; wherein if more than in values of the detection variable (since the detection variable value itself is large, a detection variable change from a latter moment to a former moment is actually selected) corresponding to the two-dimensional matrix M (M is a $n \times T_{NcT}$ two-dimensional matrix) are higher than a corresponding threshold, then a current signal of the time window is judged to have spectrum energy increase, and a step 3 is needed for further judgment; otherwise, the photovoltaic system is judged to be in normal states at the sampling moment, and detection variable values corresponding to a next sampling time are compared until all detection signals of the time window is judged to be in a normal working state of the photovoltaic system; then the step 1 is executed again to further collect. m is ranged from (n−2) to n.

Step 3: The current detection signal $x_t$ is divided into y periods (the divided period y is ranged from 2 to 10), and the adaptive optimum kernel time-frequency representation is used for analyzing time periods corresponding to $x_t$ one by one from a next period when the energy increases, in such a manner that a time-frequency distribution form of the complex matrix corresponding to the time-frequency domain of the output current signal of the photovoltaic system in this period is obtained. In order to reduce calculations and improve judgment efficiency as much as possible while ensuring the reliability of arc fault detection, real parts of corresponding elements (namely the effective frequency band) is processed with sum of squares in the time dimension to obtain a corresponding column vector; then each effective frequency band is processed with integrate operation in the frequency dimension to obtain values of multiple detection variables as input vectors before executing a step 4 to identify with the Naive Bayes model, an output frequency division scale of the adaptive optimum kernel time-frequency representation is ranged from 256 to 8192. When extracting the detection variable, the arc fault characteristic frequency bands are selected in (0, 501 kHz, and the effective frequency band is determined according to selection results. a total number of r of the extracted detection variables is ranged from 3 to 7.

Step 4: well-trained Naive Bayes model is used to classify the input vectors; wherein an output value is 0 is the period is in an arc fault state, and a step 5 is executed; otherwise, the output value is 1, the period is judge to be in a fault-like state, and a count variable is cleared before returning to the step 1 to sample the detection signals of the next time window.

Marks of the Naive Bayes model during learning and training is as follows: marking as 1 if an arc voltage in a corresponding period is zero, and marking as 0 if the arc voltage in the corresponding period is non-zero; training sample size is ranged from 1500 to 3000.

Step 5: the period having the output value of 0 classified by the naive Bayesian model with the count variable is counted, wherein if there are p periods, the photovoltaic system is judged to have arc fault, and a control signal for circuit breaking is sent out to extinguish the arc fault; otherwise, a detection signal of the next period is analyzed according to the step 3.

In order to quickly remove the arc fault and classify the fault-like working condition without malfunction, the arc fault triggering threshold p is ranged from 18 to 120.

Under certain fault-like working conditions, the detection variables obtained based on the nonlinear chirplet transform may have threshold misjudgment within certain time windows and lose the normal judgment ability of fault-like working conditions. Meanwhile, the detection variables obtained based on the adaptive optimum kernel time-frequency representation will not misjudge the fault-like working conditions in these time windows, and will present detection variable values with different fault states. The Naive Bayes model can still use the learned statistical rules of the arc faults to accurately determine the fault-like working conditions as normal, thereby reflecting that the detection algorithm of the present invention pays attention to multiple detection variables to improve reliability of identify the arc faults under the interference of the fault-like working conditions. According to the proposed multiple detection variables, the present invention has a strong arc fault identification ability, which not only avoids accidental factors causing the DC arc fault detection device to malfunction, but also ensures rapid extinction of the arc fault signal in branches.

(III) Identification Effect of the Above Fault Detection Algorithm for the Photovoltaic System on Arc Fault Working Conditions As shown in 3a, the photovoltaic system outputs a current detection signal. Before 0.6648 s, the photovoltaic system is in a normal working state. An arc fault occurs at 0.6648 s, and a large value pulse appears in the current signal. Since then, the system is in the arc fault state.

Figure 3A:
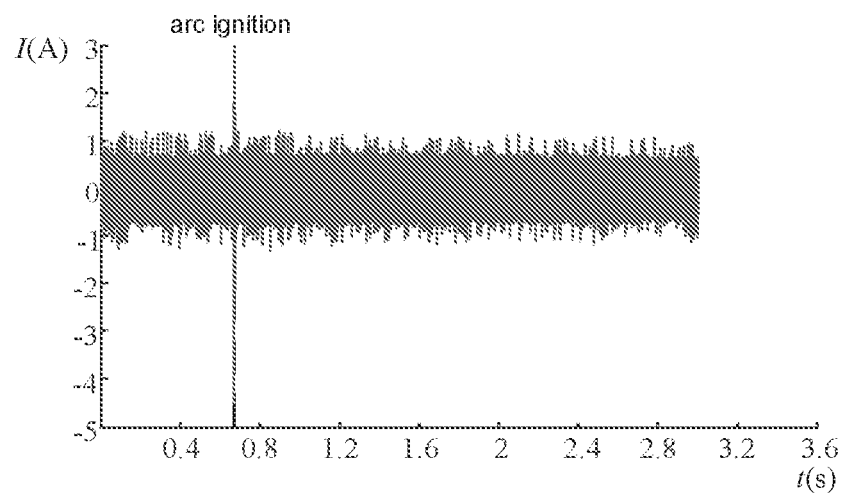
FIG. 3a shows a current signal of an arc fault.
Figure 3B:
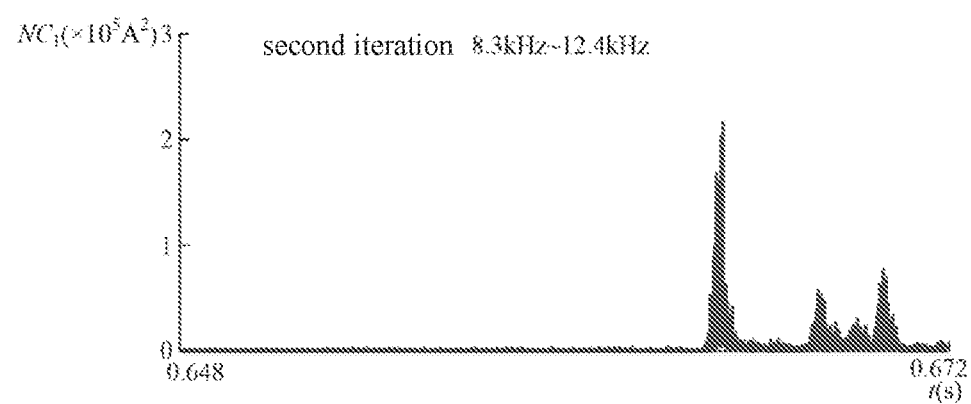
FIG. 3b, FIG. 3c, FIG. 3d, FIG. 3e, FIG. 3f, and FIG. 3g are respectively detection variable waveforms of arc fault detection of the photovoltaic system using nonlinear chirplet transform, and frequency bands used for each detection variable are $NC_1$: 8.3 kHz-12.4 kHz in a time-frequency diagram obtained by a second iteration; $NC_2$: 12.5 kHz-16.6 kHz in the time-frequency diagram obtained by the second iteration; $NC_3$: 29.2 kHz-33.3 kHz in the time-frequency diagram obtained by the second iteration; $NC_4$: 8.3 kHz-12.4 kHz in a time-frequency diagram obtained in a third iteration; $NC_5$: 25 kHz-29.1 kHz in the time-frequency diagram obtained in the third iteration; $NC_6$: 29.2 kHz-33.3 kHz in the time-frequency diagram obtained in the third iteration.
Figure 3C:
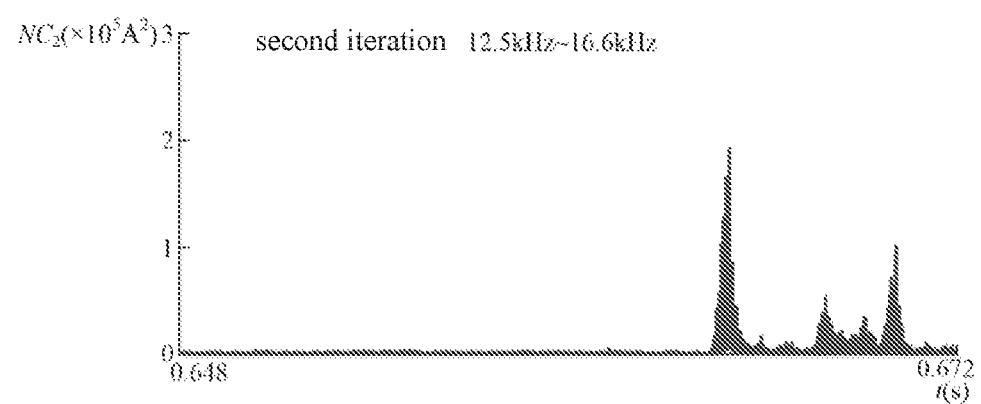
Figure 3D:
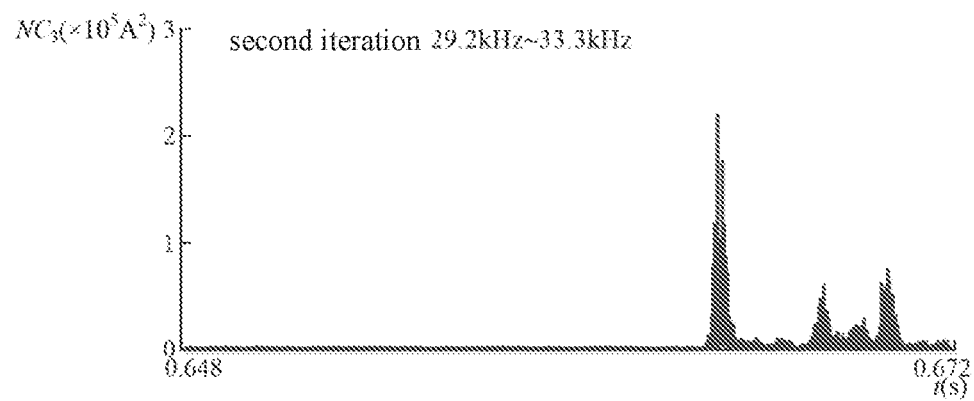
Figure 3E:
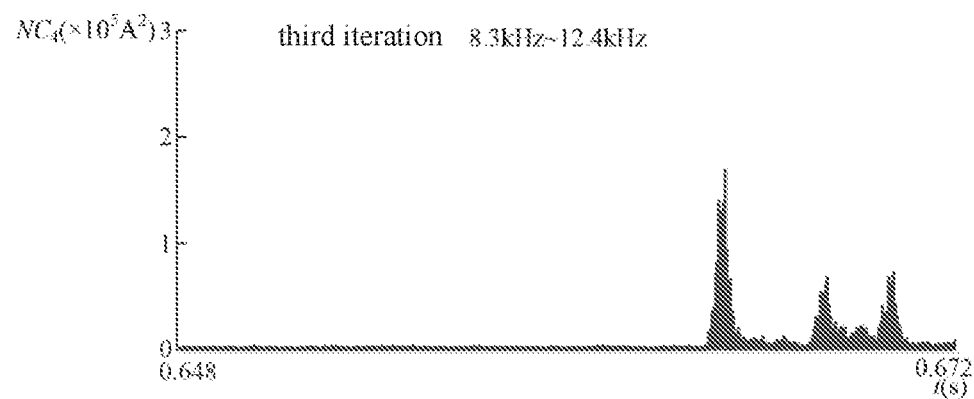
Figure 3F:
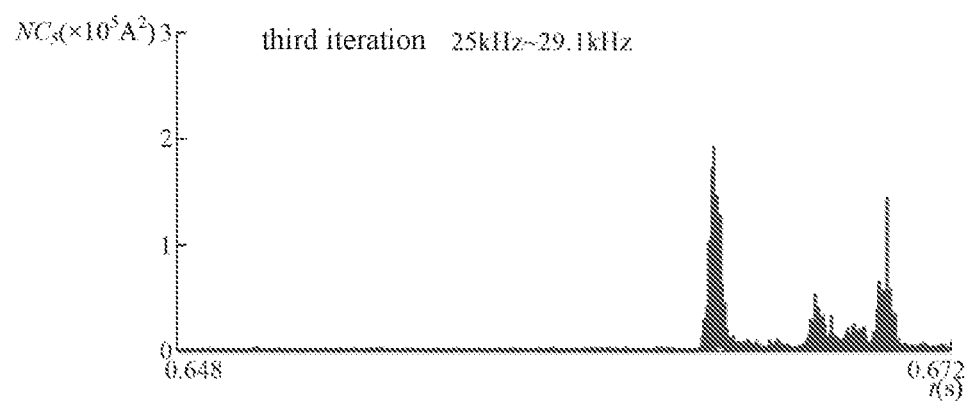
Figure 3G:
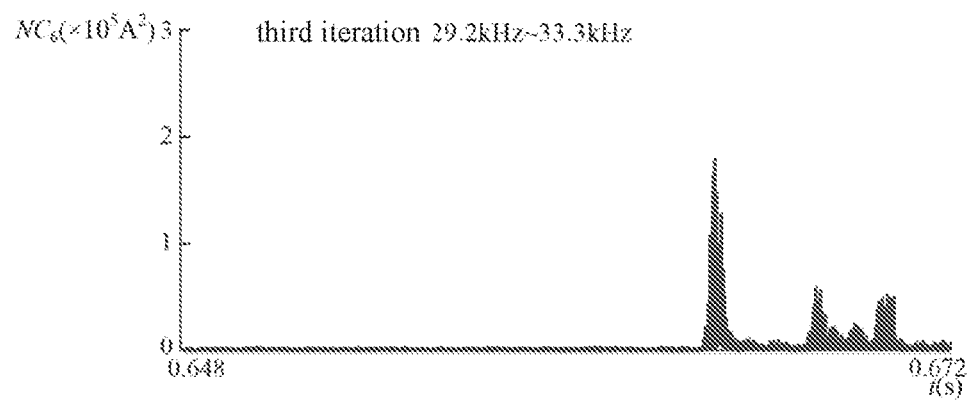
Figure 3H:
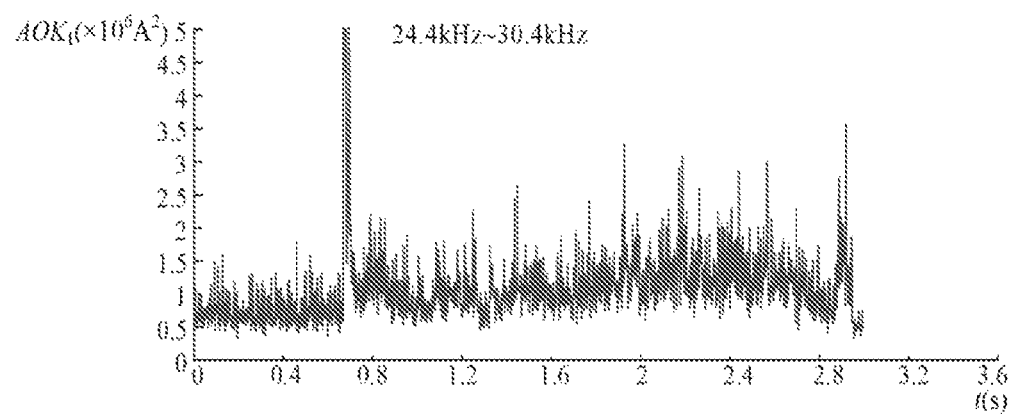
FIG. 3h, FIG. 3i, FIG. 3j, FIG. 3k, and FIG. 3l are respectively detection variable waveforms of arc fault detection of the photovoltaic system using adaptive kernel time-frequency distribution, and frequency bands used for each detection variable are $AOK_1$: 24.4 kHz-30.4 kHz; $AOK_2$: 18.3 kHz-24.3 kHz; $AOK_3$: 12.2 kHz-18.2 kHz; $AOK_4$: 6.1 kHz-12.1 kHz; $AOK_5$: 0.1-6.0 kHz.
Figure 3I:
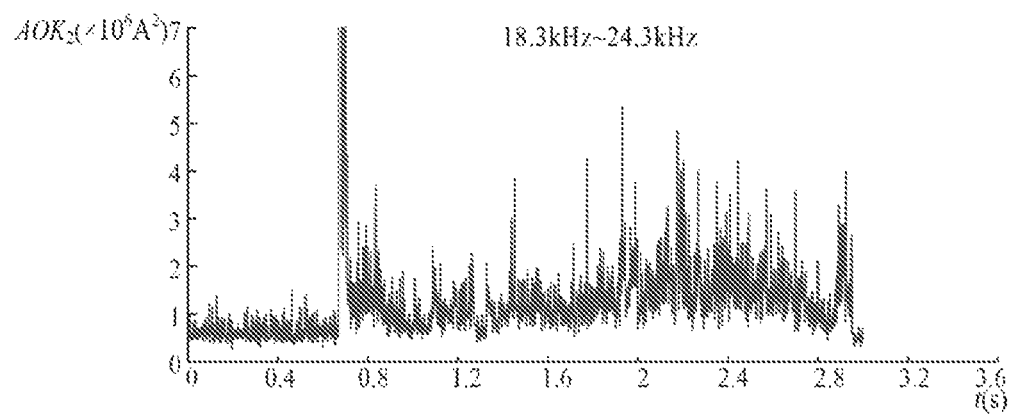
Figure 3J:
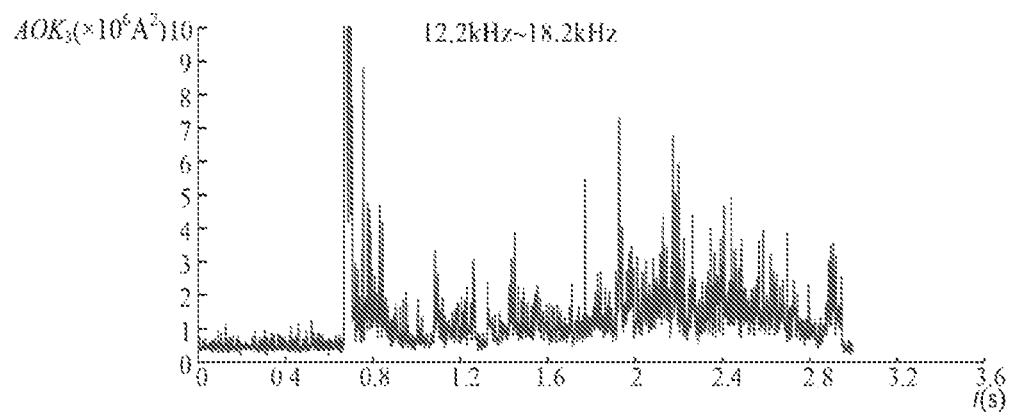
Figure 3K:
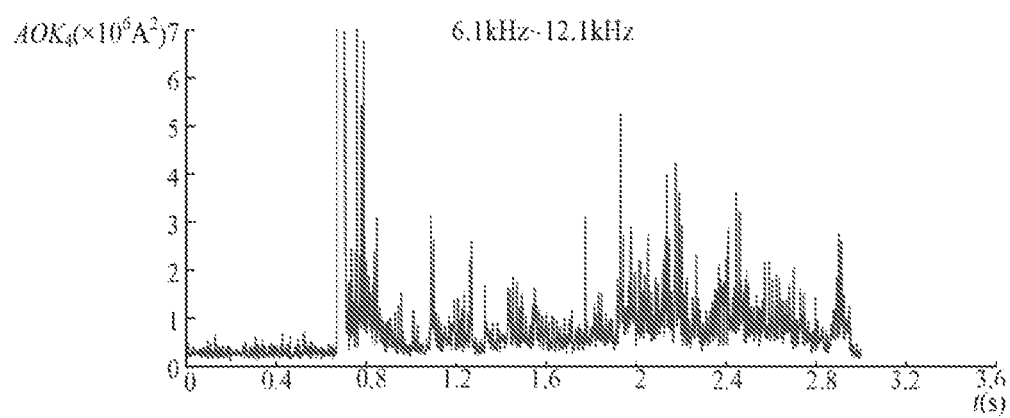
Figure 3L:
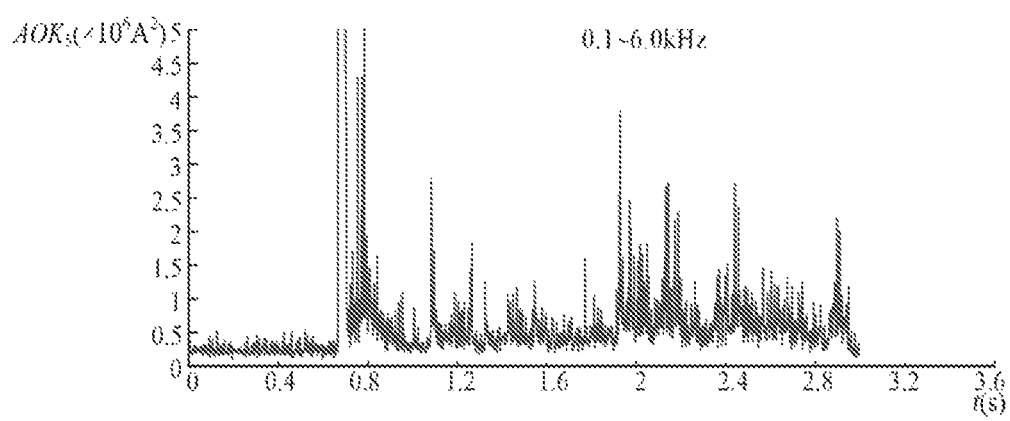

The current signal is analyzed through the nonlinear chirplet transform, and modules the obtained elements of the specified frequency component in the two-dimensional complex matrix in the time-frequency domain are calculated. An integral method (i.e. sum of squares) is adopted in the frequency dimension to extract 6 detection variables of the non-linear frequency modulation wavelet transform (as shown in FIGS. 3b-3g). Each detection variable has a large-amplitude pulse indication when the arc fault occurs, and the change of the detection variable values is greater than the corresponding predetermined threshold (the corresponding threshold column vector Y is set to be [30, 35, 75, 60, 40, 30]), which means there is an increase in spectrum energy. Since it is judged that the number of the detection variables with spectrum energy increase is larger than an initial threshold (M=5), the subsequent adaptive optimum kernel time-frequency representation and Naive Bayes model analysis are performed on the current signal after the arc fault pulse shown in FIG. 3a.

The current signal is analyzed through the adaptive optimum kernel time-frequency representation. The real part of the corresponding elements in the two-dimensional complex matrix in the time-frequency domain is processed with sum of squares along the time dimension, and the integral method is used in the frequency dimension, so as to obtain five detection variables based on the adaptive optimum kernel time-frequency representation. In order to show the difference between the normal and arc fault states, the calculation results of the adaptive optimum kernel time-frequency representation of the current signal in all periods are given, as shown in FIGS. 3h-3l. Among them, each detection variable has a short, extremely large-amplitude pulse indication at the time of the arc faults. After the arc fault occurs, the detection variable value becomes larger than that of the normal working state as a whole. This consistent large amplitude state is conducive to accuracy identification of the arc faults.

Figure 3M:
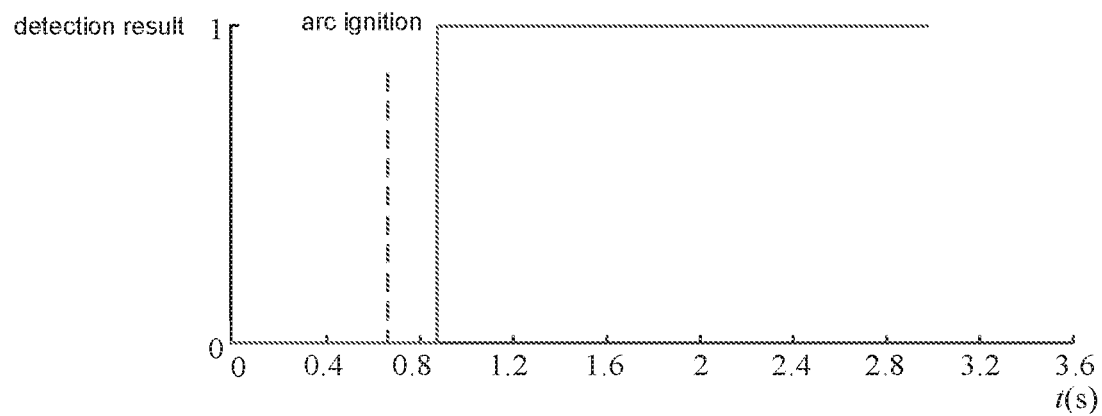
FIG. 3m illustrates a system state judgment output signal (for FIG. 3a) of the arc fault detection of the photovoltaic system according to the present invention.

The five time-frequency detection variable values calculated above are input to the well-trained Naive Bayes model to determine whether there is an arc fault in the photovoltaic system. When the Naive Bayes model outputs 1, it is judged that the photovoltaic system is in a fault-like state at this period, and the aforementioned nonlinear frequency-modulated wavelet transform has been misjudged, then the state detection of the output current signal of the photovoltaic system in the next period is continued. When the Naive Bayes model outputs 0, it is judged that an arc fault may occur in the photovoltaic system at this period, and it is necessary to further confirm the occurrence of the arc fault through a predetermined arc fault removal standard (P), wherein if there are 100 continuous periods outputting 0, it is determined that the arc fault has occurred in the photovoltaic system, and a signal for breaking the arc fault branch is sent to a corresponding circuit breaker. Referring to FIG. 3m, the detection algorithm can give correct outputs for normal working current (determining that it does not meet the requirements of the arc fault removal standard), and can give correct outputs for the fault state current signal (determining that it has satisfied the arc fault removal standard).

(IV) Identification Effect of the Above Fault Detection Algorithm for the Photovoltaic System on a Variety of Fault-Like Working Conditions Due to Normal Operation 4.1 Identification Effect on Arc Fault Working Conditions Due to Load Change of the Photovoltaic System As shown in 4a, the photovoltaic system outputs a current detection signal. Before 1.093 s, the photovoltaic system is in a normal working state. The load change occurs at 1.093 s, forming a similar current abrupt change in the time domain.

Figure 4A:
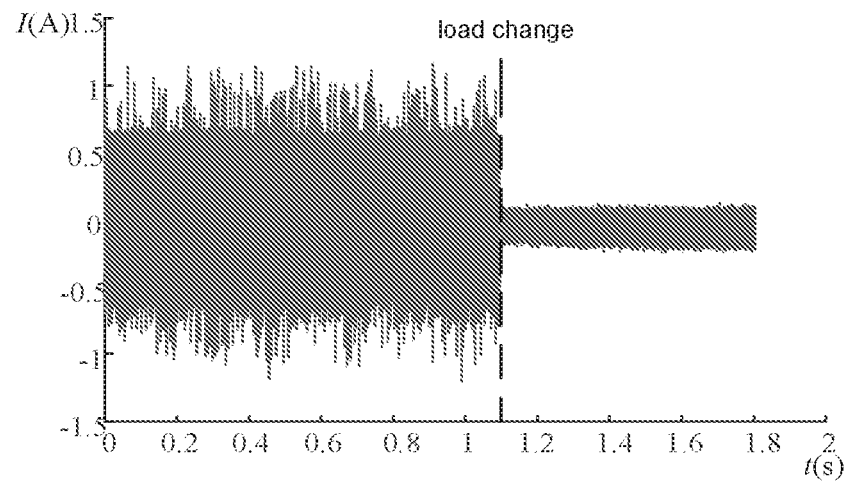
FIG. 4a illustrates a fault-like current signal of load change.
Figure 4B:
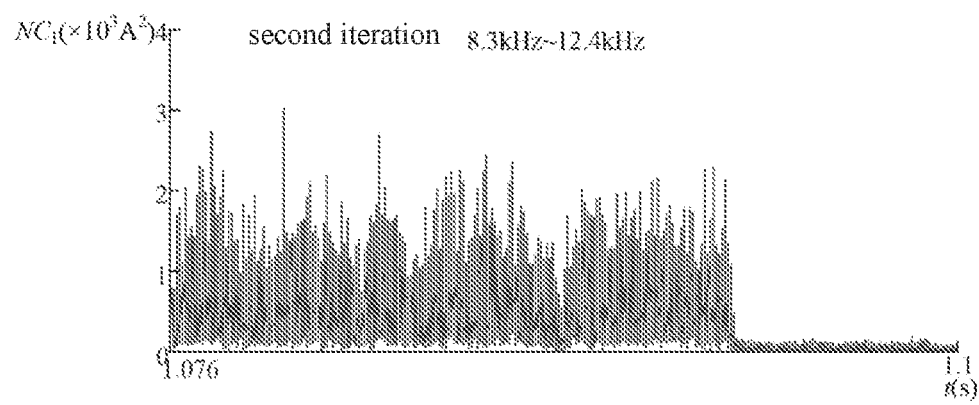
FIG. 4b, FIG. 4c, FIG. 4d, FIG. 4e, FIG. 4f, and FIG. 4g are respectively the detection variable waveforms of the arc fault detection of the photovoltaic system using the nonlinear chirplet transform, and the frequency bands used for each detection variable are $NC_1$, $NC_2$, $NC_3$, $NC_4$, $NC_5$ and $NC_6$.
Figure 4C:
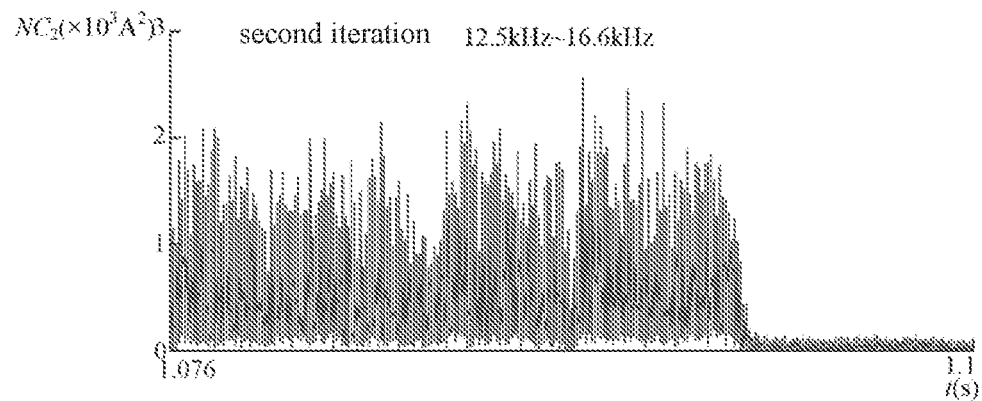
Figure 4D:
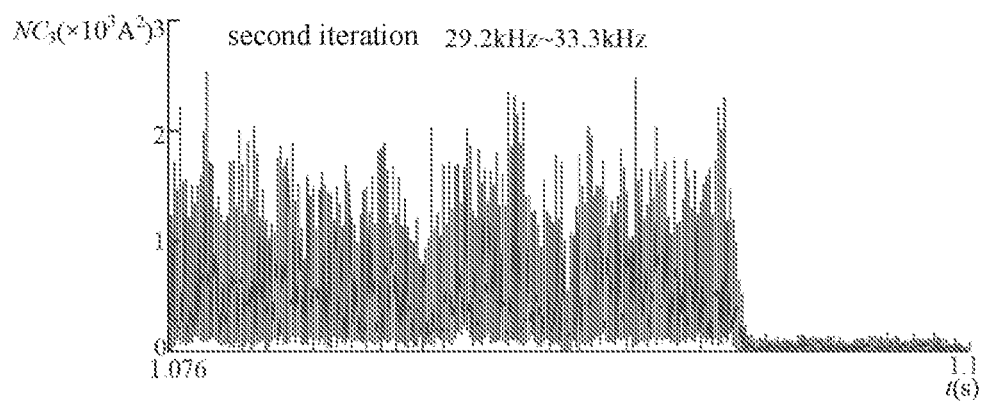
Figure 4E:
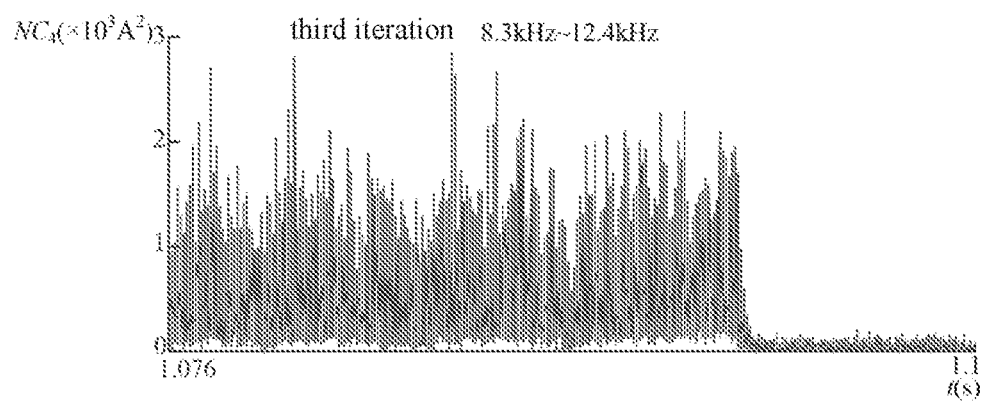
Figure 4F:
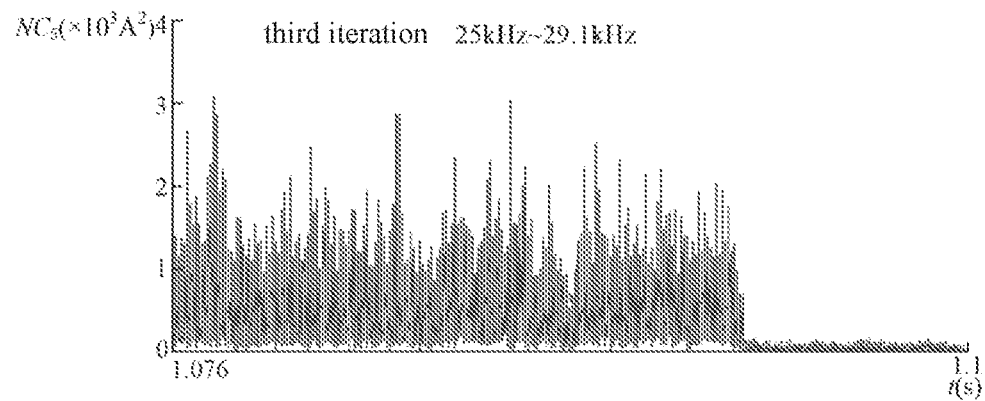
Figure 4G:
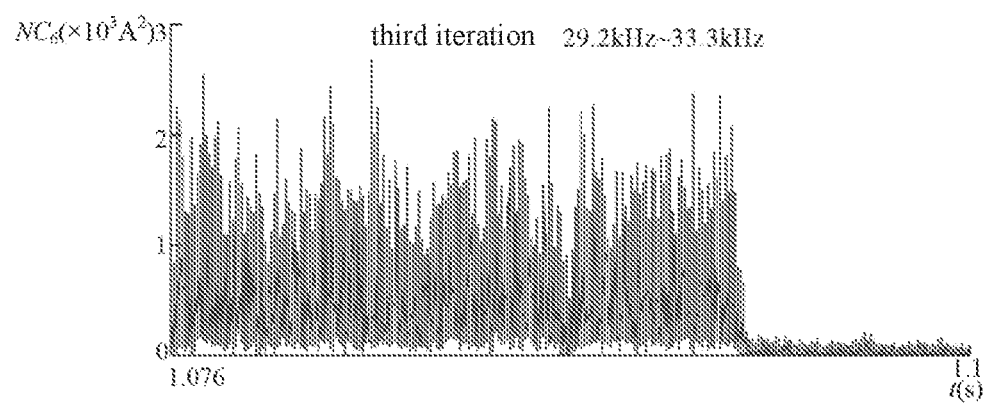
Figure 4H:
FIG. 4h illustrates the system state judgment output signal (for FIG. 4a) of the arc fault detection of the photovoltaic system according to the present invention.

The current signal is analyzed through the nonlinear chirplet transform, and modules the obtained elements in the two-dimensional complex matrix in the time-frequency domain are calculated. An integral method (i.e. sum of squares) is adopted in the frequency dimension to extract 6 detection variables of the non-linear frequency modulation wavelet transform as shown in FIGS. 4b-4g. Each detection variable has a significantly reduced amplitude at the moment of system load change, and the change of the detection variable value is smaller than the corresponding given threshold in Y, which can be determined that there is no spectrum energy increase. Because the number of the detection variables for determining the spectrum energy increase is less than the predetermined threshold m, the subsequent adaptive optimum kernel time-frequency representation and Naive Bayes model analysis are not needed for the current signal. Referring to FIG. 4h, judgment by the threshold (m) can provide correct output, which shows that the photovoltaic system is in a normal working state within this time window. Then the state detection of the output current signal of the photovoltaic system within the next time window is continued.

Figure 5A:
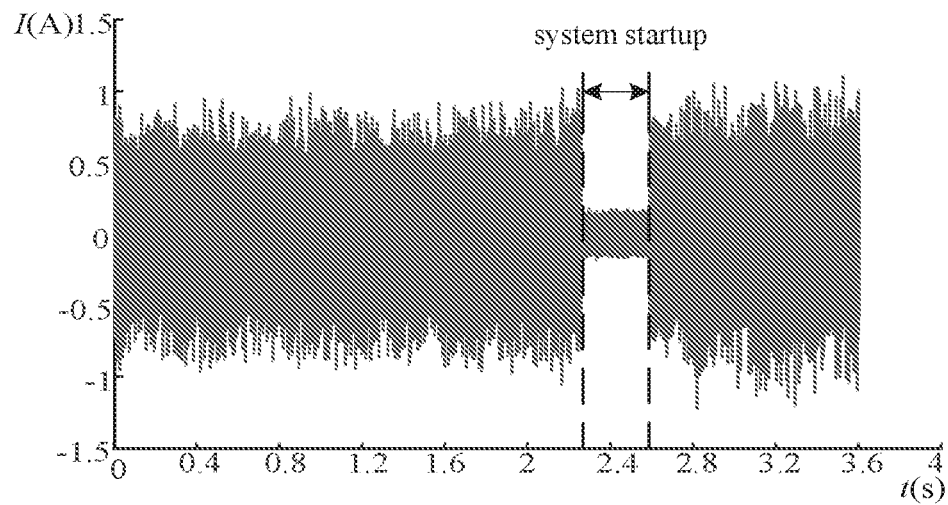
FIG. 5a illustrates a fault-like current signal of system startup.
Figure 5B:
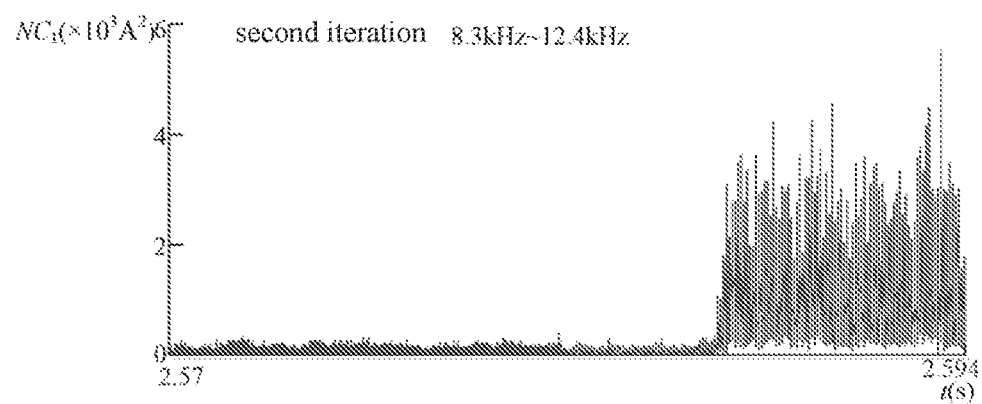
FIG. 5b, 5c, FIG. 5d, FIG. 5e, FIG. 5f, and FIG. 5g are respectively the detection variable waveforms of the arc fault detection of the photovoltaic system using the nonlinear chirplet transform, and the frequency bands used for each detection variable are $NC_1$, $NC_2$, $NC_3$, $NC_4$, $NC_5$ and $NC_6$.
Figure 5C:
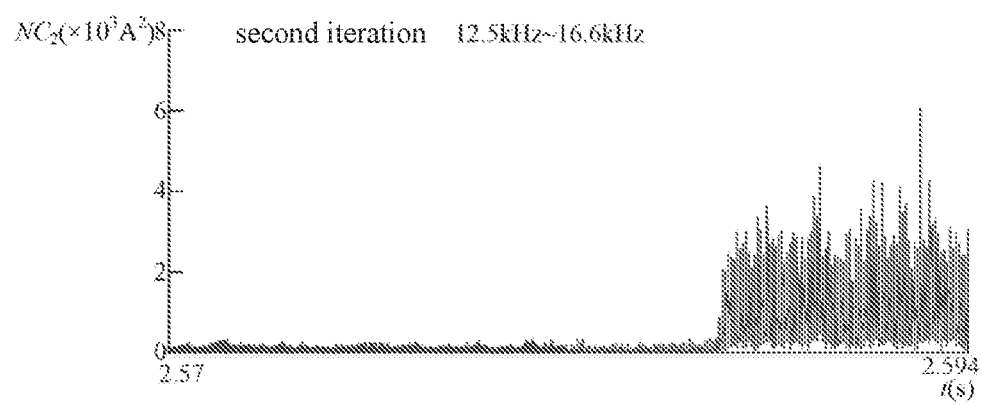
Figure 5D:
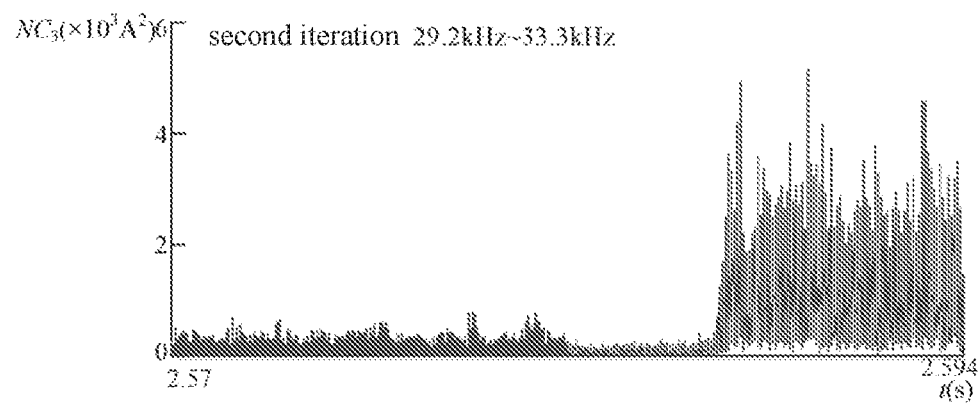
Figure 5E:
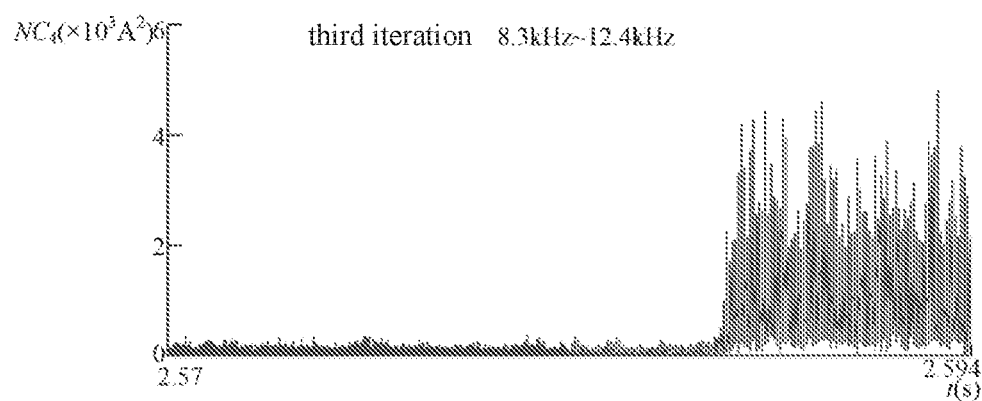
Figure 5F:
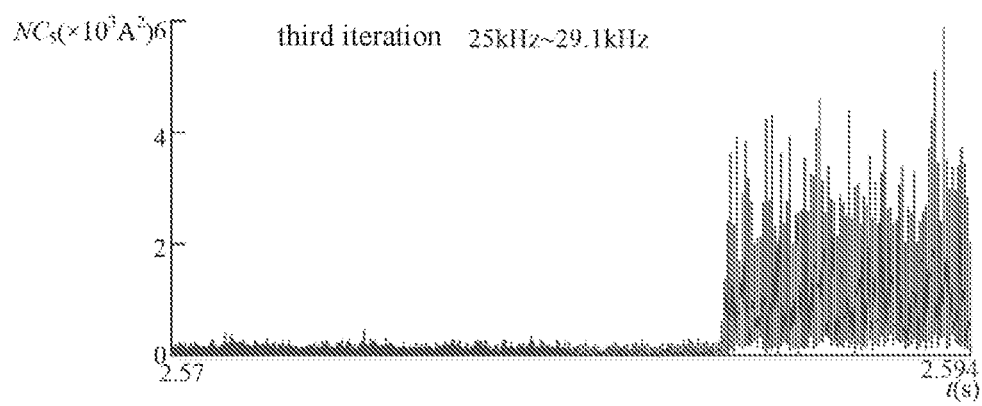
Figure 5G:
Figure 5H:
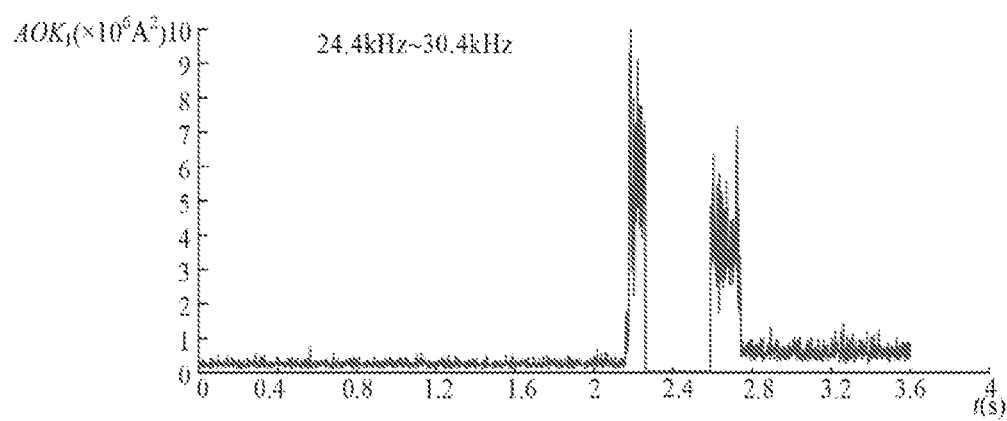
FIG. 5h, FIG. 5i, 5j, FIG. 5k, and FIG. 5l are respectively detection variable waveforms of arc fault detection of the photovoltaic system using adaptive kernel time-frequency distribution, and frequency bands used for each detection variable are $AOK_1$, $AOK_2$, $AOK_3$, $AOK_4$ and $AOK_5$.
Figure 5I:
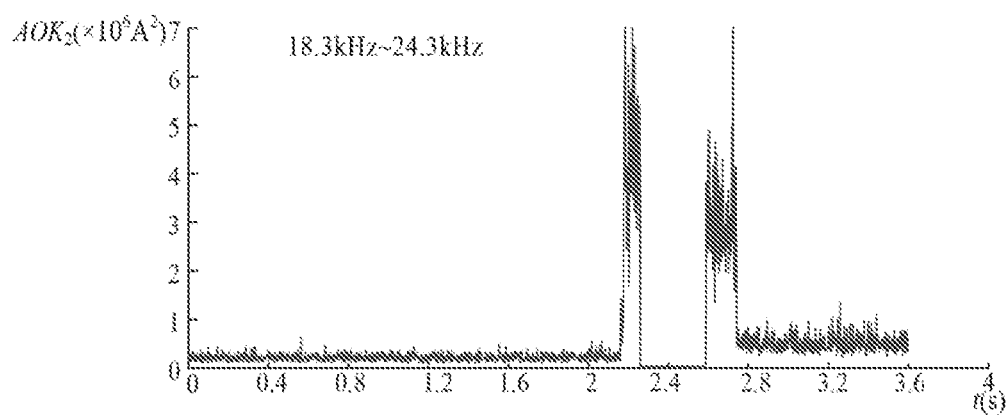
Figure 5J:
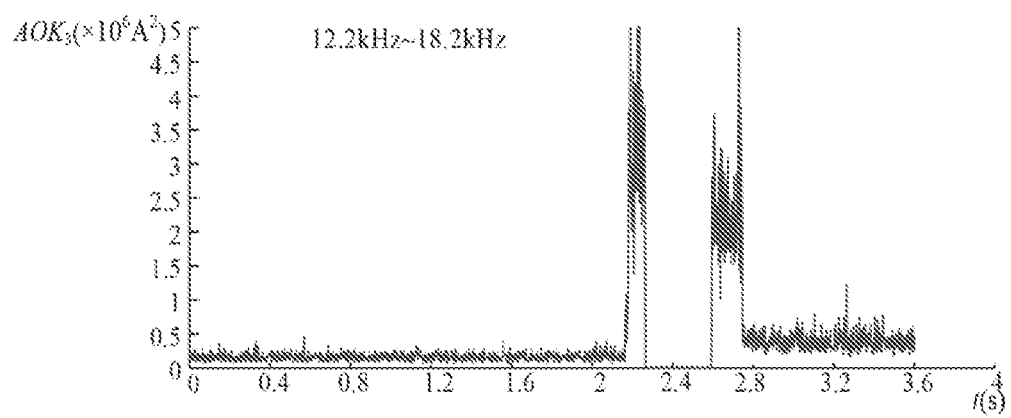
Figure 5K:
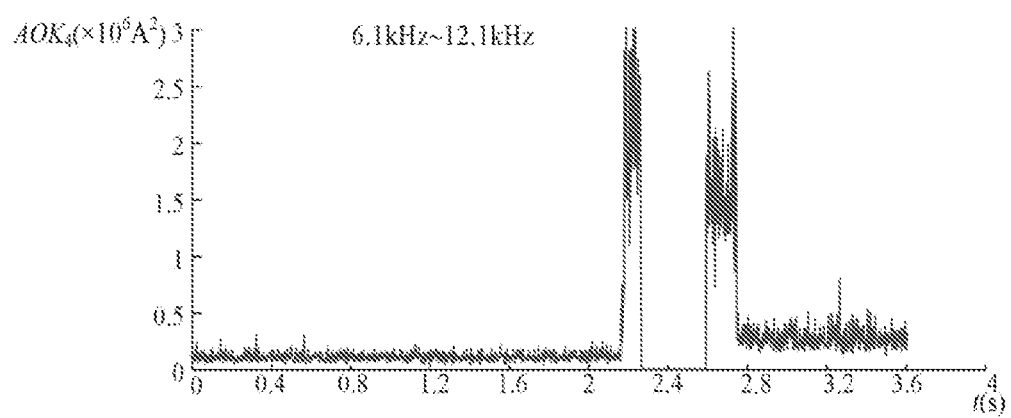
Figure 5L:
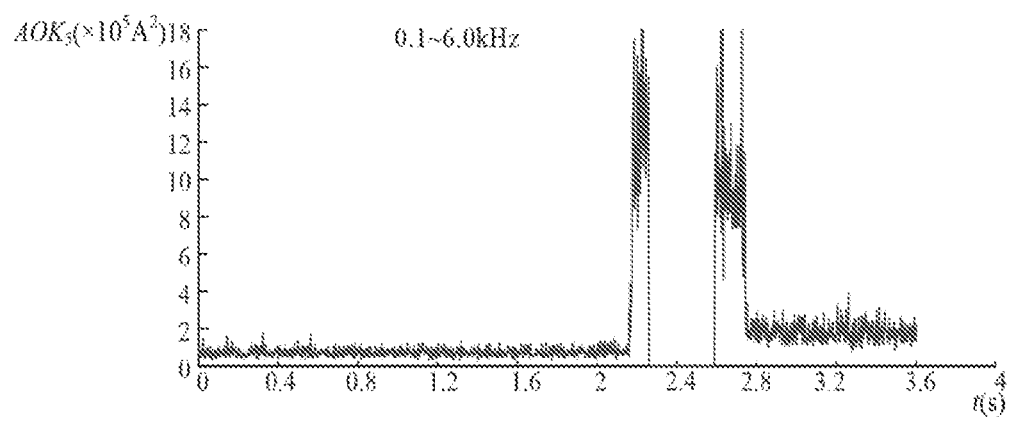

4.2 Identification Effect on Arc Fault Working Conditions Due to System Startup of the Photovoltaic System As shown in FIG. 5a, the photovoltaic system outputs a current detection signal. Before 2.256 s, the photovoltaic system is in a normal shutdown state. The system startup process begins at 2.256 s, forming a smaller time domain current amplitude level similar to that of FIG. 4a. At 2.586 s, the system startup process ends, forming a larger time domain current amplitude level, and entering a normal working state.

The current signal is analyzed through the nonlinear chirplet transform, and modules the obtained elements in the two-dimensional complex matrix in the time-frequency domain are calculated. An integral method (i.e. sum of squares) is adopted in the frequency dimension to extract 6 detection variables of the non-linear frequency modulation wavelet transform. The fault-like working condition at 2.256 s is similar to the fault-like working condition shown in FIG. 4a, so the amplitude of the detection variable corresponding to the nonlinear chirplet transform will also decrease significantly as shown in FIGS. 4b-4g. The change of the detection variable value is smaller than the corresponding threshold, and the system is determined to be in the normal working state. Although the detection variables extracted based on the adaptive optimum kernel time-frequency representation analysis as shown in FIGS. 5h-5l present the arc fault mode as shown in FIGS. 3h-3l, correct judgment can be given in advance based on the nonlinear chirplet transform, and the subsequent adaptive optimum kernel time-frequency representation analysis is not performed.

The nonlinear chirplet transform level here only gives the corresponding current analysis results for subsequent adaptive optimum kernel time-frequency representation and Naive Bayes model analysis, as shown in FIGS. 5b-5g. At 2.586 s, each detection variable based on the nonlinear chirplet transform has a continuous amplitude increase process as shown in FIGS. 3b-3g, which determines that there is spectrum energy increase, and turns to the subsequent adaptive optimum kernel time-frequency representation analysis. The current signal is analyzed through the adaptive optimum kernel time-frequency representation, and the real part of the corresponding element in the two-dimensional complex matrix in the time-frequency domain is processed with sum of squares along the time dimension, and the integral method is used in the frequency dimension to obtain 5 detection variables based on the adaptive optimum kernel time-frequency representation. Calculation results of the current signals in all periods are shown in FIGS. 5h-5l. The average detection variable value amplitude of each detection variable before 2.586 s is extremely small, and the amplitude state is significantly different from the normal working state before the arc fault occurs (amplitude level before 0.6 s as shown in FIGS. 3h-3l and amplitude level after 2.8 s as shown in FIGS. 5h-5l), so there is a significant mode difference between the system startup process and the normal working state, which also confirms that the detection variables extracted based on the adaptive optimum kernel time-frequency representation can distinguish arc fault from fault-like working conditions. At 2.256 s and 2.586 s, nonlinear chirplet transform and adaptive optimum kernel time-frequency representation are respectively used to complete the correct system state judgment processes, which fully illustrates the importance of multi-method comprehensive judgment for accurate judgment of arc faults.

Figure 5M:
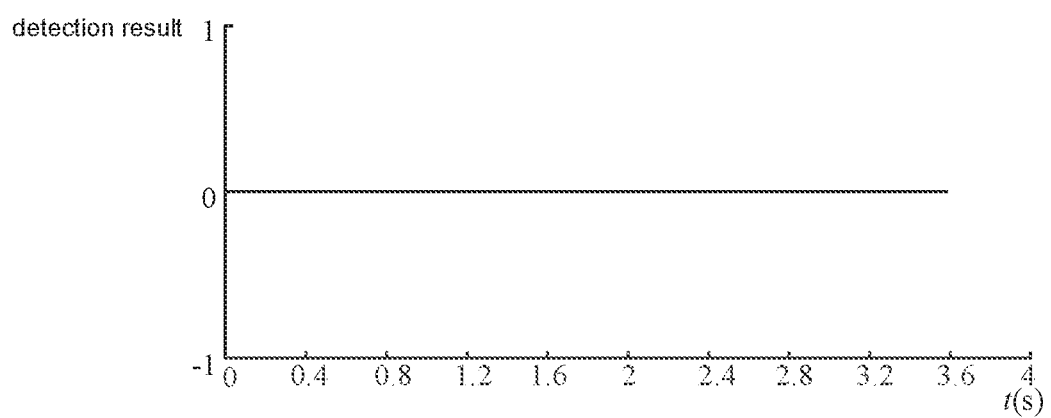
FIG. 5m illustrates the system state judgment output signal (for FIG. 5a) of the arc fault detection of the photovoltaic system according to the present invention.

The five calculated time-frequency detection variable values are input into the Naive Bayes model. The continuous outputs of 1 by the Naive Bayes model fail to meet the triggering threshold P, which means the fault-like working condition occurs in the photovoltaic system at this time. As a result, the circuit breaker control signal will not be sent, and state detection of the output current signal of the photovoltaic system within the next time window is performed. Referring to FIG. 5m, the detection algorithm can give a correct output (determining that the requirements of the arc fault removal standard are not met) without causing misjudgment.

In short, the photovoltaic arc fault detection method provided by the present invention is divided into two steps of nonlinear chirplet transform-threshold judgment and adaptive optimum kernel time-frequency representation-Naive Bayes model classification. The first step provides high calculation resolution, wherein the moment of arc fault is accurately captured. Once an energy increase trend is identified within the current analysis time window, it can quickly enter the second step. Staggered sequence of the second step and the first step makes the whole algorithm consume less memory and have high calculation efficiency. In both steps, multiple time-frequency detection variables are extracted. Even if individual detection variable fails, the effective identification of the arc faults and the fault-like conditions can still be correctly completed by other effective detection variables, which improves identification reliability of the arc fault or the fault-like working condition, solves the problem of accurately, reliably and rapidly processing the arc faults in the photovoltaic systems under the interference of the fault-like working conditions, and effectively prevents safety threats caused by the arc faults to photovoltaic system operation and personal property.

What is claimed is:

1. An arc fault detection method for a photovoltaic system based on an adaptive kernel function and instantaneous frequency estimation, comprising steps of:
   1) sampling current signals in the photovoltaic system point by point with $T_{NCT}$ as a time window length to obtain a detection signal $x_t$, and executing a step 2);
   2) processing the detection signal $x_t$ with nonlinear chirplet transform to obtain complex time-frequency matrices of the detection signal $x_t$ after multiple iterations; selecting u iterated complex time-frequency matrices, and processing modules of elements at specified frequency components of the selected u iterated complex time-frequency matrices with sum of squares in a frequency dimension; extracting n detection variables $NC_i(t)$, i=1, 2, 3 . . . , n, and forming a two-dimensional matrix M of $n \times T_{NCT}$; calculating a detection variable change from a latter moment to a former moment of M along a time dimension, and comparing with corresponding elements of a threshold column vector Y; wherein if more than m values of the detection variable change corresponding to a sampling moment in a time window are higher than a corresponding threshold, then a current signal of the time window is judged to have spectrum energy, increase; and the detection signal $x_t$ is divided into y periods before executing a step 3); otherwise, the photovoltaic system is judged to be in a normal states at the sampling moment, and the detection variable change corresponding to a next sampling time is compared until all detection signals of the time window are judged and the photovoltaic system is in the normal state; then the step 1) is executed again to sample detection signals of a next time window;
   3) performing adaptive optimum kernel time-frequency representation from a next period of the spectrum energy increase to obtain corresponding iterated complex time-frequency matrices in time-frequency domain; selecting r frequency bands in the frequency dimension, and processing real parts of corresponding elements with sum of squares in the time dimension to obtain a corresponding column vector; then processing each of the selected r frequency bands with integration operation in the frequency dimension to extract r detection variables as input vectors, and executing a step 4);
4) using well-trained Naive Bayes model and values of the corresponding r detection variables to conduct state classification of the input vectors; wherein if an output value is 0, the period is judged to be in an arc fault state, and a step 5) is executed; if the output value is 1, the period is judged to be in a fault-like state, and a count variable is cleared before returning to the step 1) to sample the detection signals of the next time window; and
5) counting the period having the output value of 0 classified by the naive Bayesian model with the count variable, wherein if there are p periods having the output value of 0, the photovoltaic system is judged to have arc fault, and a control signal for circuit breaking is sent out to extinguish the arc fault; otherwise, the next period of the detection signal $x_t$ is analyzed according to the step 3).

2. The arc fault detection method, as recited in claim 1, wherein the current signals are signals sampled by a Hall sensor and filtered by a high-pass filter, or signals directly sampled by a current transformer.

3. The arc fault detection method, as recited in claim 1, wherein $T_{NCT}$ is ranged from 4 ms to 40 ms; the periods y is ranged from 2 to 10.

4. The arc fault detection method, as recited in claim 1, wherein polynomial order selected by the nonlinear chirplet transform is ranged from 10 to 30; an iteration termination condition is reaching a predetermined number of iterations, and the number of the iterations is ranged from 3 to 8; an output frequency division scale of the adaptive optimum kernel time-frequency representation is ranged from 256 to 8192.

5. The arc fault detection method, as recited in claim 1, wherein u is ranged from 2 to 5; the frequency component is specified according to arc fault characteristic frequency bands; the number of arc fault characteristic frequency bands selected at different iterations is same or different; the arc fault characteristic frequency bands are all within 5-50 kHz, and the selected arc fault characteristic frequency bands partially overlap or are continuously divided or have intervals; n is ranged from 5 to 10.

6. The arc fault detection method, as recited in claim 1, wherein a threshold setting principle in the threshold column vector Y is to obtain amplitude change mode of the detection signal $x_t$ at each detection variable level, and the threshold corresponding to the different detection variables $NC_i(t)$ is same or different; m is ranged from (n−2) to n.

7. The arc fault detection method, as recited in claim 1, wherein the r frequency bands are selected according to arc fault characteristic frequency bands within (0, 50] kHz; the selected arc fault characteristic frequency bands partially overlap or are continuously divided or have intervals; r is ranged from 3 to 7.

8. The arc fault detection method, as recited in claim 1, wherein an output state of the Naive Bayes model during learning and training is marked as follows: marking as 1 if an arc voltage in a corresponding period is zero, and marking as 0 if the arc voltage in the corresponding period is non-zero; training sample size is ranged from 1500 to 3000.

9. The arc fault detection method, as recited in claim 1, wherein p is ranged from 18 to 120.

* * * * *